United States Patent

Bergmann

[11] Patent Number: 5,494,069
[45] Date of Patent: Feb. 27, 1996

[54] CHECK VALVE

[75] Inventor: Konrad Bergmann, Wittlich, Germany

[73] Assignee: Ideal-Standard GmbH, Bonn, Germany

[21] Appl. No.: 175,407

[22] PCT Filed: Jun. 4, 1992

[86] PCT No.: PCT/EP92/01239

§ 371 Date: Feb. 15, 1994

§ 102(e) Date: Feb. 15, 1994

[87] PCT Pub. No.: WO93/01435

PCT Pub. Date: Jan. 21, 1993

[30] Foreign Application Priority Data

Jul. 5, 1991 [AT] Austria ................................ 1355/91

[51] Int. Cl.$^6$ ........................................ F16K 17/18
[52] U.S. Cl. ........................................ 137/493.2; 137/843
[58] Field of Search ........................... 137/493.2, 493.3, 137/493.4, 493.5, 843

[56] References Cited

U.S. PATENT DOCUMENTS

| | | | |
|---|---|---|---|
| 1,512,630 | 10/1924 | Mueller et al. . | |
| 1,942,313 | 1/1934 | Viele | 137/493.3 |
| 2,708,449 | 5/1955 | Kiethley . | |
| 2,995,148 | 8/1961 | Novak | 137/493.4 |
| 3,153,423 | 10/1964 | Biello | 137/493.5 |
| 3,229,715 | 1/1966 | Walsh | 137/843 |
| 3,337,091 | 8/1967 | Bartels | 137/843 X |
| 3,414,334 | 12/1968 | Payne | 137/493.2 X |
| 3,896,845 | 7/1975 | Parker | 137/493.3 |
| 3,976,096 | 8/1976 | Kass | 137/493.2 |
| 4,301,828 | 11/1981 | Martin, Jr. . | |
| 4,425,939 | 1/1984 | Marinoni | 137/843 X |
| 4,561,559 | 12/1985 | Rutan | 137/493.5 X |
| 4,757,158 | 7/1988 | Lentz . | |

FOREIGN PATENT DOCUMENTS

| | | |
|---|---|---|
| 258062 | 11/1967 | Austria . |
| 306467 | 4/1973 | Austria . |
| 2605030 | 4/1988 | France . |
| 2036708 | 9/1971 | Germany . |
| 2063682 | 7/1972 | Germany . |
| 7429928 U | 2/1977 | Germany . |
| 3237418A1 | 12/1984 | Germany . |
| 9104764 U | 7/1991 | Germany . |
| 49-62726 | of 0000 | Japan . |
| 2230062 | 10/1990 | United Kingdom . |

*Primary Examiner*—Robert G. Nilson
*Attorney, Agent, or Firm*—Herbert Dubno

[57] ABSTRACT

The invention relates to a check valve, particularly for sanitary water fittings, whereby preferably the valve closing member (11) is composed of a cone (4) and a cone cap (5), which is provided in the closing direction of the check valve with a dome-like attachment (12) wherein the valve closing member 98) of a pressure-relief valve is located, while the cone (4) has in the opening direction of the check valve a tubular extension (14) with a lateral inlet opening (13), the upper end of this extension forming a valve seat (15) for the valve closing member (8) of the pressure-relief valve (10), whereby this valve closing member (8) on its side facing away from the valve seat (15) rests on the top (16) of the attachment (12).

2 Claims, 1 Drawing Sheet

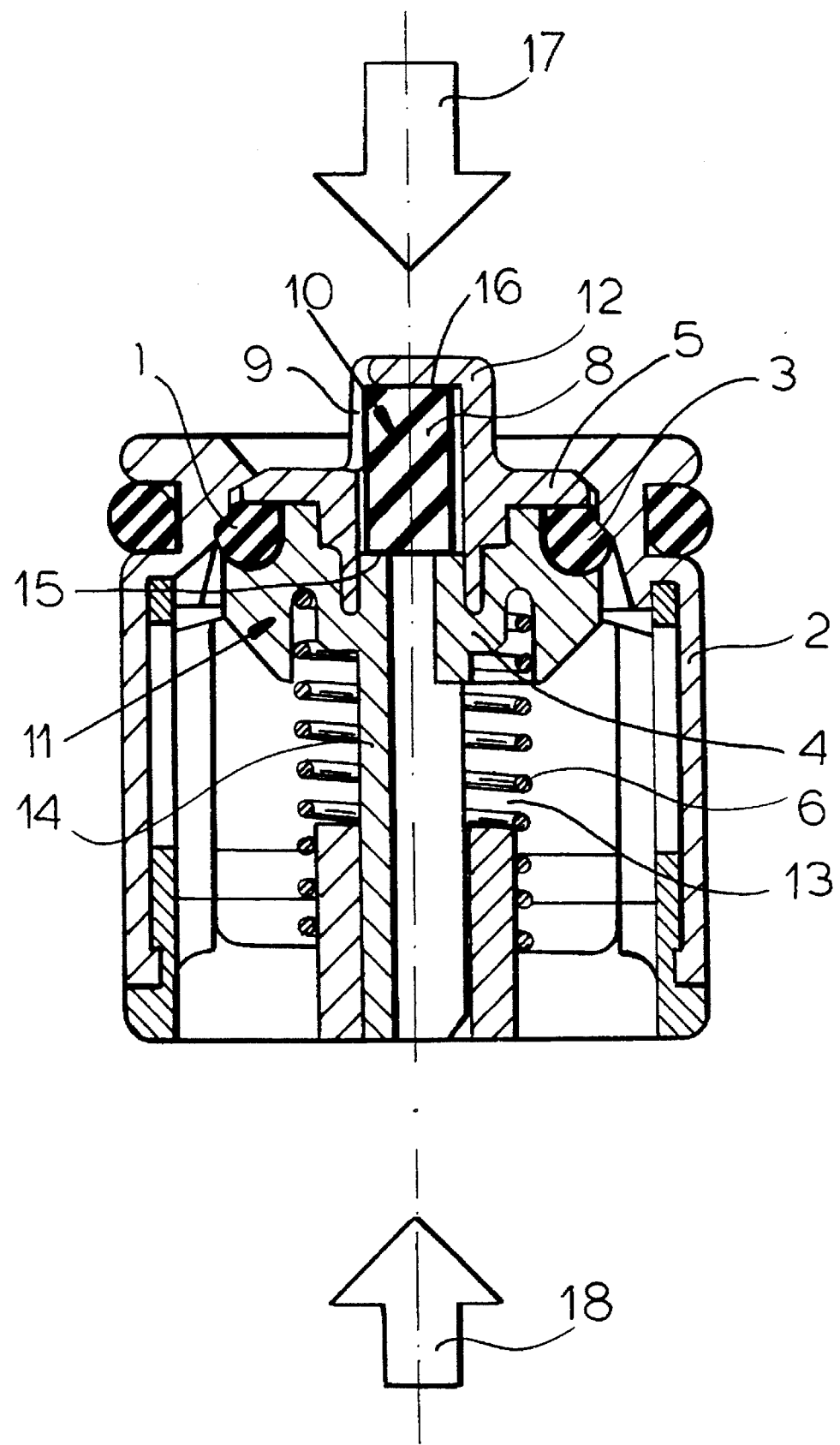

CHECK VALVE

CROSS REFERENCE TO RELATED APPLICATION

This application is a national phase of PCT/EP92/01239 filed 4 June 1992 and based upon Austrian national application A 1355/91 of 5 July 1991 under the International Convention.

FIELD OF THE INVENTION

The invention relates to a check valve, particularly for sanitary water fittings with a valve seat and a valve closing member, equipped with a pressure-relief valve which is effective, i.e. opens, in the closing direction of the check valve.

BACKGROUND OF THE INVENTION

There is a tendency to build check valve in a reinforced manner, in order to avoid for instance the penetration of water in the fresh water supply duct, in case of underpressure.

The mounting of check valves can become critical when they are meant to be used in connection for instance with single-lever mixing faucets. When, in these fittings, the cold water side is closed off and only the hot water side is open, the cold water check valve being also closed at the same time, the water between the latter and the closed cold water valve seat of the mixing faucet can be heated so intensely, that system pressures result which can damage the fitting. This danger is particularly great at pressures over 16 bar.

From U.S. Pat. No. 4,561,559 a check valve for fuel delivery is known, in whose valve closing member a pressure-relief valve is provided, whereby the valve closing member of the check valve as well as the pressure-relief valve are subjected to spring action. Such a safety device is of course indispensable for a device meant to distribute fuel and for its maintenance. High costs are acceptable in view of the risks.

However when it comes to use in sanitary water fittings the safety device has to be manufactured at low cost, with regard to the material as well as to production time, and practically maintenance free.

OBJECT OF THE INVENTION

It is the object of the invention to provide a check valve, particularly for sanitary water fittings, which can be produced at a relatively low cost, which has a simple construction and which operates safely.

SUMMARY OF THE INVENTION

This object is achieved by providing that the valve closing member of the check valve is composed of a cone and a cone cap which is provided in the closing direction of the check valve with a domed attachment having a lateral outlet aperture, the valve closing member of the pressure-relief valve being located in this attachment, while in the opening direction of the check valve the cone has a tubular extension with a lateral inlet aperture, whose upper end forms a valve seat for the valve closing member of the pressure-relief valve, whereby this valve closing member is supported on the top of this attachment on its side facing away from the valve seat.

Preferably the valve-closing member of the pressure-relief valve consists of an elastic preshaped part, e.g. made of rubber.

BRIEF DESCRIPTION OF THE DRAWING

The above and other objects, features, and advantages will become more readily apparent from the following description, reference being made to the accompanying drawing the sole FIGURE of which is an axial section through a check valve of the invention.

SPECIFIC DESCRIPTION

The check valve is built in the usual manner, in that the housing 2 is at the same time designed to be the valve seat 1, against which the valve closing member 11 seals under the action of spring 6 and with the assistance of a seal 3. The opening direction of the check valve is illustrated by arrow 17. The pressure-relief valve 10 according to the invention is built into the valve closing member 11 of the check valve. The valve closing member 11 of the check valve consists of a cone 4 having a tubular extension 14 with a lateral inlet opening 13 and a cone cap 5 with a dome-like attachment 12 having a lateral outlet opening 9. Between the top 16 of the dome-like attachment 12 and the upper end of the tubular extension 14, which serves as the valve seat 15 of the pressure-relief valve 10, the valve closing member 8 of the pressure-relief valve 10 is prestressed into the sealed position. The valve closing member 8 of the pressure-relief valve 10 is here an elastic preshaped piece.

If for instance this check valve is built into the cold water supply line of a single-lever mixing faucet, wherein the cold water side is closed off but the hot water side is open and the cold water check valve is closed, then high pressure can be generated due to the heating of the water between the closed cold water valve of the fitting and the closed cold water check valve, pressure which acts on the pressure-relief valve 10, in the direction of arrow 18 through the opening 13 in the tubular extension 14, so that the valve closing member 8 is lifted from the valve seat 15 and the water can escape through the lateral outlet opening 9 of the dome-like attachment 12.

I claim:

1. A checkvalve for a sanitary water fitting, comprising:

a housing formed with a checkvalve seat;

a valve member juxtaposed with said seat and formed with a tubular extension extending away from said seat, a laterally open valve cap extending toward said seat and communicating with said extension at a shoulder defining a floor of said cap, said extension being open at one side of said seat when said member is closed against said seat and said valve cap being open on an opposite side of said seat when said member is closed against said seat, said valve cap having a head spaced from said shoulder;

a spring in said housing biasing said member against said seat into a closed position wherein said member blocks flow from said one side to said opposite side; and an elastic body confined in said cap and braced between said head and said shoulder normally blocking flow from said one side to said opposite side, but deformable upon development of a pressure excess at said one side to relieve said pressure by admitting flow from said one side to said opposite side.

2. A checkvalve for a sanitary water fitting wherein said elastic body is composed of rubber.

* * * * *